United States Patent [19]
Yang

[11] Patent Number: 6,159,372
[45] Date of Patent: Dec. 12, 2000

[54] METHOD FOR TREATING WASTE WATER WITH A HIGH CONCENTRATION OF ORGANIC MATTER BY USING BALL SHAPED CIRCULATING AND ELONGATED STATIONARY CILIARY FILTER CAKES

[76] Inventor: Ik-Bae Yang, 213-26 Anyang 7-Dong, Manan-Ku, Anyang-City, Kyungki-Do, Rep. of Korea

[21] Appl. No.: 09/033,768

[22] Filed: Mar. 3, 1998

[51] Int. Cl.[7] .................................. C02F 3/30; C02F 3/06
[52] U.S. Cl. ........................... 210/605; 210/615; 210/620
[58] Field of Search .................................... 210/610, 605, 210/615–617, 620, 150, 629, 151, 743, 903

[56] References Cited

U.S. PATENT DOCUMENTS

| | | |
|---|---|---|
| 4,422,930 | 12/1983 | Hatanaka . |
| 4,717,519 | 1/1988 | Sagami . |
| 4,758,453 | 7/1988 | Challet et al. . |
| 4,908,128 | 3/1990 | Chiba . |
| 5,085,766 | 2/1992 | Born . |
| 5,399,266 | 3/1995 | Hasegawa et al. . |
| 5,423,988 | 6/1995 | Yamasaki et al. . |
| 5,500,111 | 3/1996 | Fujino . |
| 5,560,819 | 10/1996 | Taguchi . |
| 5,580,770 | 12/1996 | DeFiilippi . |
| 5,702,604 | 12/1997 | Yamasaki et al. . |
| 5,718,823 | 2/1998 | Tomita et al. . |
| 5,985,148 | 11/1999 | Liu . |

FOREIGN PATENT DOCUMENTS 1-242193  9/1989  Japan .

*Primary Examiner*—David A. Simmons
*Assistant Examiner*—Fred Prince
*Attorney, Agent, or Firm*—Merchant & Gould P.C.

[57] ABSTRACT

The method of treating waste water includes a first process step for supplying circulating filter cakes containing populating, multiply microbes and flagellates under facultative anaerobic conditions in the biological reaction tank; and a second process step for supplying filter cakes secured to the walls of the aeration tank and containing populating, multiplying microbes, protozoa and metazoa. Preferably, a plurality of ball shaped circulating, ciliary contact filter cakes are disposed in the biological reaction tank, with a plurality of elongated stationary, ciliary contact filter cakes secured to the waste water aeration tank. The circulating and elongated filter cakes provide for enhanced biological support thereby increasing the population of microorganisms and therefore the quality of the water treated.

5 Claims, 4 Drawing Sheets

METHOD FOR TREATING WASTE WATER WITH A HIGH CONCENTRATION OF ORGANIC MATTER BY USING BALL SHAPED CIRCULATING AND ELONGATED STATIONARY CILIARY FILTER CAKES

BACKGROUND OF THE INVENTION

1. Field of the Invention

The present invention relates to a device and method for treating waste water having a high concentration of organic matter by using a circulating ciliary contact filter cake which provide a microbial habitat and have numerous cilia which are composed of polypropylene (PP), nylon and the like.

2. Description of the Related Art

A very highly concentrated organic waste water is generally produced in industries related to alcohol, foods, paper, leather articles, and livestock. In the worse situation, the concentration of the organic materials contained in the waste water is greater than 1%. When the organic materials have such a high concentration in the waste water, microbes propagate in the waste water so that the sludge precipitation is ineffective in case of waste water treatment by the activated sludge technique and further the sludge is highly concentrated due to the multiplication of decomposing microbes, which leads to inefficiency in waste water treatment.

SUMMARY OF THE INVENTION

Therefore, an object of the present invention is to provide a method of eliminating non-decomposable materials contained in the organic waste water of high concentration by using a plurality of circulating, ciliary contact filter cakes to which bacteria, flagellates, etc., can readily attach to permitting their active propagation even in highly concentrated organic waste water.

DETAILED DESCRIPTION OF THE PREFERRED EMBODIMENT

Hereinafter, the present invention will be described by way of illustrative examples with reference to the accompanying drawings.

The present invention is basically composed of two processes: the first one is a process for removing highly concentrated organic materials including BOD (biological oxygen demand ) and hydrogen by using a plurality of ball shaped circulating, ciliary contact filter cakes; the second is a process for removing the residual BOD and other contaminating materials, mainly, BOD, COD (chemical oxygen demand) and organic materials, notably, hydrogens remaining in the waste water by using an elongated stationary, ciliary contact filter with lower life forms such as microbes, protozoa and metazoa attached thereto.

Figure 1:
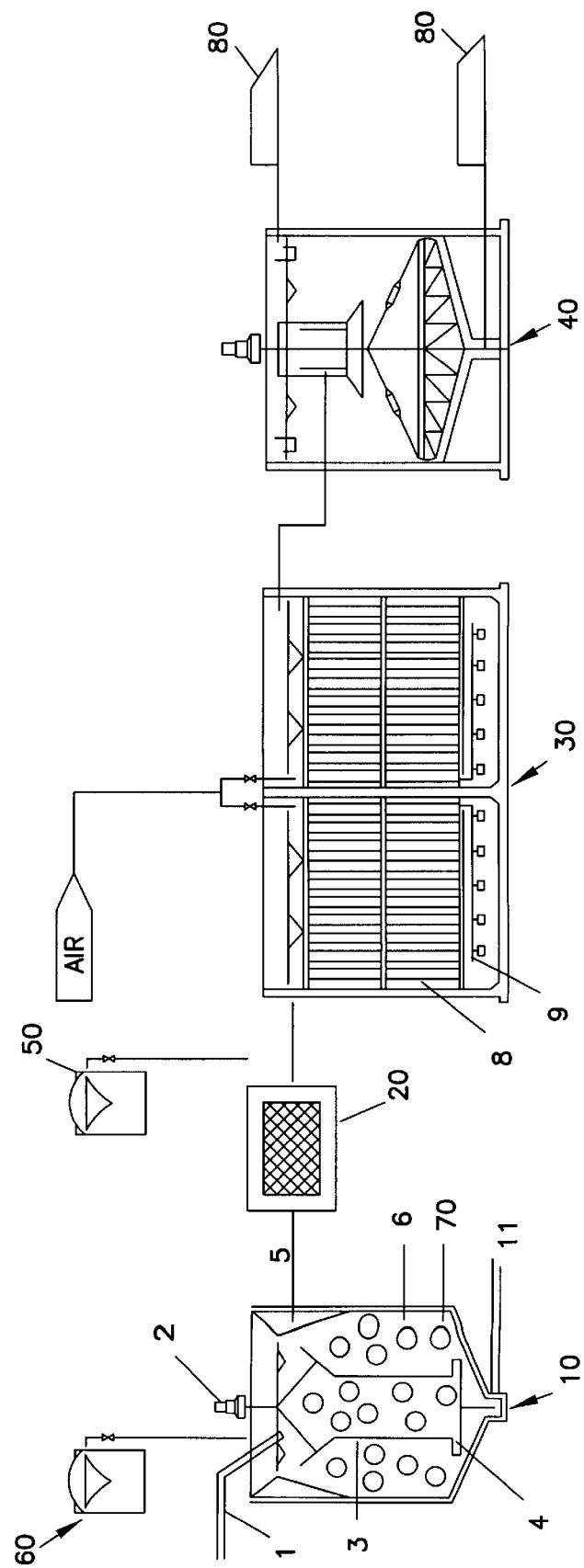
FIG. 1 is a diagram illustrating the process for treating waste water by using ball shaped circulating and elongated stationary, ciliary contact filter cakes.
Figure 2:
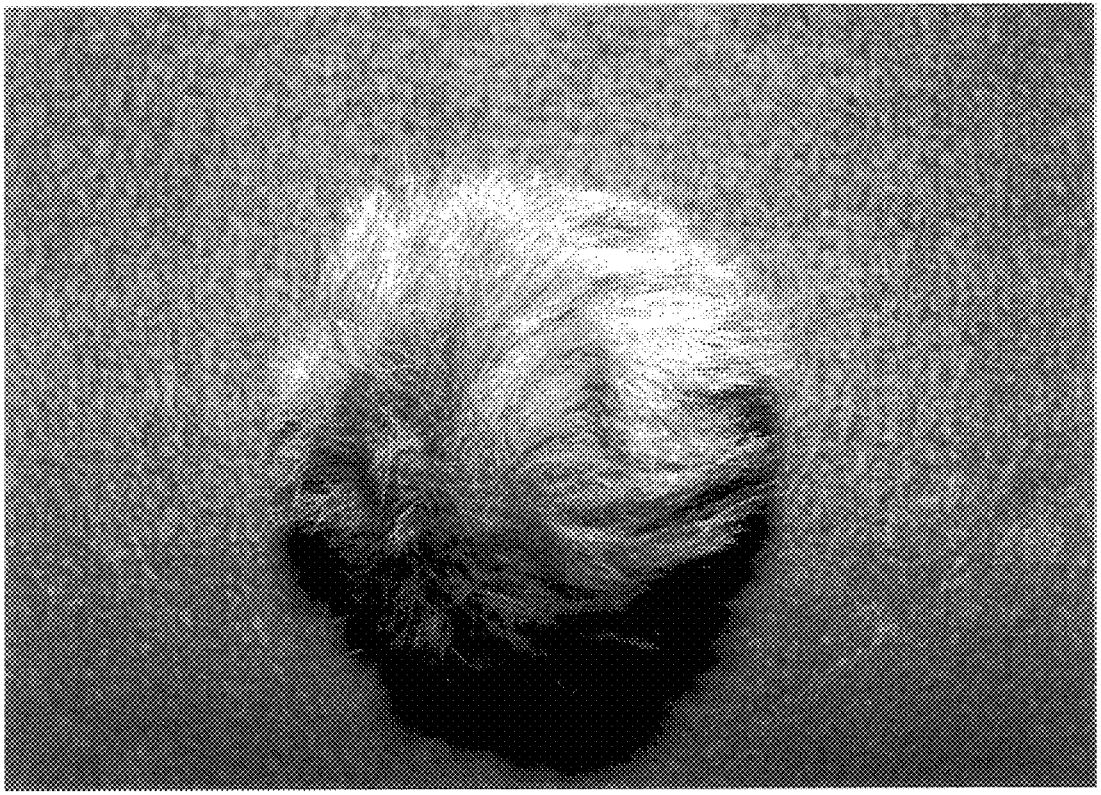
FIG. 2 is a view of the ball shaped circulating, ciliary contact filter cake having long cilia in accordance with the present invention.
Figure 3:
FIG. 3 is a view of the ball shaped circulating, ciliary contact filter cake having short cilia in accordance with the present invention.
Figure 4:
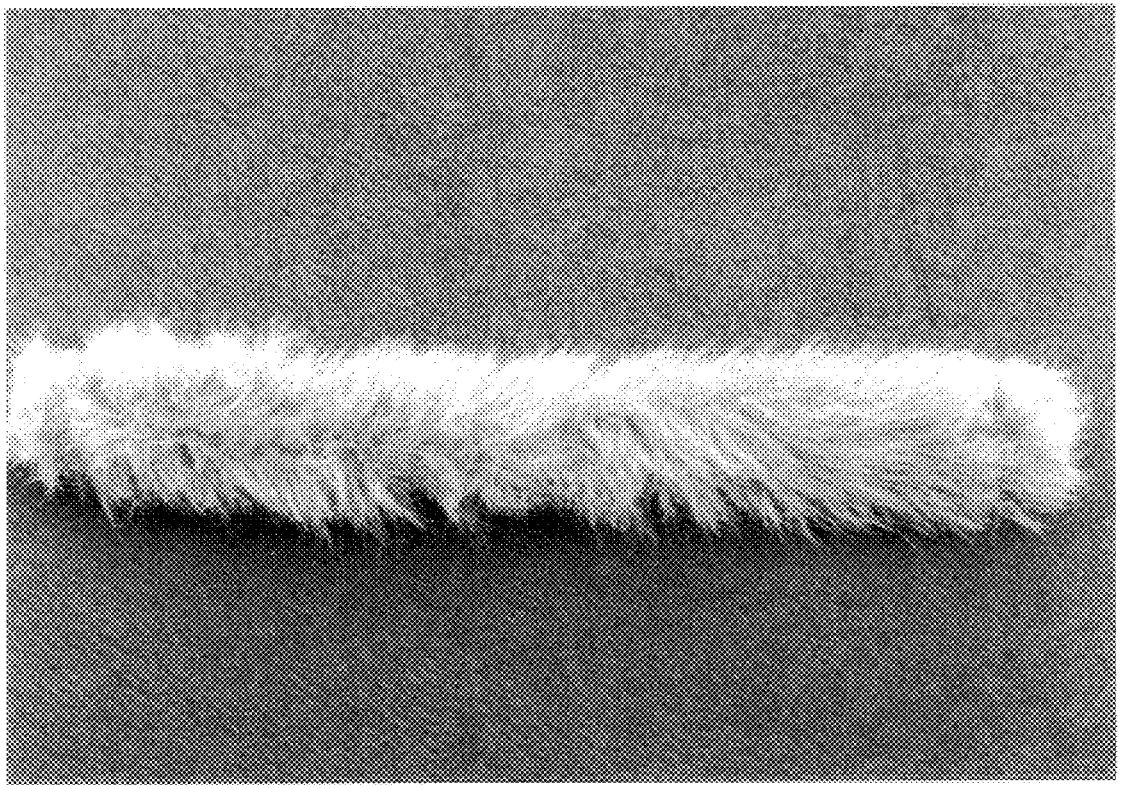
FIG. 4 is a view of an elongated stationary, ciliary contact filter cake in accordance with the present invention.

In the first process, during the introduction of a waste water 1 into a biological reaction tank to have the waste water in contact with microbes under the facultative anaerobic condition, suspended filter cakes 6 are returned and circulated to the upper part of the biological reaction tank through the outlet (4) at the bottom of the circulation tank 3 by means of water pressure and rotational or circulating force imparted in the tank 3 by motor 2 rotating circulation tank 3. One or more biological reaction tanks associated in a series, i.e. with another tank 3, may be used according to the concentration of the organic materials contained in the incoming waste water in the first process. That is, the plurality of suspended filter cakes 6 are circulated out the bottom 4 of the circulation tank 3 and into the biological reaction tank and then into the top of the circulation tank 3 following the current flow of the waste water established by the flow of incoming waste water and the rotating circulation tank 3. The ball shaped filter cakes 6 may have a diameter of about 0.5 to 2 centimeters with the length of the cilia thereon being about 1 to 7 centimeters, as seen in FIGS. 2 (long cilia) and 3 (short cilia). The cilia are flexible, strong and provide a populating microbial habitat.

In the second process, two waste water treatment aeration tanks 30 are constructed using a plurality of elongated stationary ciliary contact filter cakes and air diffusing pipes 9 installed at the bottom of the aeration tanks 30. The length of the elongated cilia contact filter cakes can vary with the size of the aeration tank 30, with the cilia being about 3 to 7 centimeters. The system may have two or more aeration tanks, if needed. The technical construction characterizing the present invention is the plurality of ball shaped, or the like, filter cakes 6 which circulate in the biological reaction tank 10 in the first process step and the plurality of elongated stationary ciliary contact filter cakes 8 in the aeration tank 30 in the second process step. A precipitation tank 40 for discharging the finally treated water 80 and sludge 90 is provided in the system.

The reason that the ball shaped circulating ciliary contact filter cakes are used in the reaction tank of the first process is to induce a more effective decomposition of the organic materials, such as by denitrification, by the facultative anaerobic bacteria and flagellates (protozon, metazoa, and the like) attached and multiplying on the ciliary contact filter cake, and additionally to prevent the working microbes from being removed/washed away from the surface of the circulating contact filter cake since the cilia of the contact filter cake are entangled so as to retain the attachment of the microbes. That is, the object is to retain the working microbes in the biological tank and prevent them from being washed away to the aeration tank. The ball shaped circulating ciliary (contact filter cakes introduced into the first reaction tank uses immobilized microorganisms on carriers obtained by introducing a highly concentrated culture liquid of bacteria and flagella, which are very excellent in decomposing organic and "non"-decomposable waste water, onto each of the ball shaped contact filter cakes 70 with the cilia entangled with one another, see FIG. 2 for example, and drying it at about 60 degrees Celsius, thereby immobilizing the microbes onto the ball cake and enhancing the efficiency of the waste water treatment. In addition, the elongated ciliary contact filter cakes are also treated the same way but using different microorganisms, as see Tables 4 and 8, below.

Further, the reason tat the elongated stationary, ciliary contact filter cake is used in the reaction tank of the second process is that a part of the bacteria and flagellates which formed during the first process can be adsorbed onto the stationary, ciliary contact filter cake in the second process, inducing multiplication of such microbes, protozoa and metazoa attached thereto. These organisms may also be used to regulate the changes in the pH of the waste water and the concentration of the organic materials contained in the waste water discharged from the first process, as appreciated by one skilled in the art. Such an elongated ciliary contact filter cake is easy to place into the aeration tank because of its rope-like shape and, also, it facilitates the transfer of oxygen onto the entire surface thereof, thus providing a stabilized high quality treated water. Accordingly, the object of the present invention is to treat a highly concentrated organic waste water and to remove nitrogen from the waste water by using the ciliary contact filter cakes circulating in the reaction tank and positioned in the aeration tank, such cakes being selected depending on the process for the waste water treatment.

Normally, a highly concentrated organic waste water undergoes chemical pre-treatment. According to the resent invention, however, the waste water is directly introduced into the first process without performing any chemical pre-treatment.

While such highly concentrated waste water is typically acidic waste water in the pH range of 3–6, the present invention recovers the waste water having a pH range of 3–8 with a reduction of expenses for chemicals needed in regulating the pH of the waste water and uses an agitating device instead of an aeration system in the first step of the process, thus reducing the equipment and maintenance costs of the first process. Since highly concentrated waste water has an unbalanced C/N ratio, however, it is necessary to add methanol and/or urea (from supply tank 60 or the like) as compounds of carbon and nitrogen sources required in the first process to enhance the efficiency of denitrification.

Introduction of magnesium chloride ($MgCl_2$) into the aeration tank (from supply tank 50) is very important in removing the nitrogen and phosphorus in the second process. That means, methanol used in the first process as a carbon source helps nitrification bacteria, Nitrosomonas and denitrification bacteria, Nitrobacter in biologically nitrifying and denitrifying under the anaerobic condition as well as in facilitating the multiplication of other microbes, protozoa and metazoa.

In addition, if MLSS (mixed lignor suspended solids) contained in the waste water in an amount of greater than 10,000 ppm to facilitate the multiplication of microbes and flagellates is not appropriately removed, the sludge accumulates and undergoes anaerobic decomposition resulting in a rapid decrease in the treatment efficiency of the first process. As the discharge of the sludge is such a very critical factor determining the efficiency of the first process that the sludge should be discharged front the reaction tank immediately after it looks dark in the aeration tank of the first process. For this reason a sludge discharge pipe 11 is installed at the bottom of the reaction tank 10. Water treated in the biological reaction tank is conveyed via pipe 5, being screened 20 (to catch any ball shaped filter cakes, etc.) prior to flowing into the aeration tank 30 for the second process step. In the first process methanol contained in supply tank 60 is used to lower the pH, if necessary, to enhance the growth of the necessary microorganisms. In addition, supply tank 50 supplies magnesium chloride, in necessary to adjust the pH, to the water treated in the first process step as it flows into the aeration tank 30 for the second step.

The following examples describe the preferred embodiments of the present invention and should not be interpreted as limiting the scope of the invention defined in the accompanying claims.

Embodiment 1

Using the device of the present invention waste water treatment of alcohol waste water produced by the Moo-Hak So-Joo manufacturing Co. was treated. The composition of the alcohol waste water is given as follows.

TABLE 1

| | |
|---|---|
| COD (mg/l) | 1,500 |
| SS* (mg/l) | 300 |
| pH | 3.0 |
| sugar (mg/l) | 600 |

*suspended solids

The waste water is treated in the first reaction (one biological reaction tank) and the second reaction (two aeration tanks) of the present invention. The facultative anaerobic reaction tank has the capacity of 60 L, while the two aeration tanks have the capacity of 600 L with the water resting time of 1.5 days in total. Further, the charged ciliary contact filter cake is 1,260 $m^2$ in area.

TABLE 2

COD treatment efficiency

| | |
|---|---|
| First Process | 900 mg/l |
| Second Process | 60 mg/l |
| Entire Process | 96% |

TABLE 3 pH in the reaction and aeration tanks

| | |
|---|---|
| First Process | 5 |
| Second Process | 7.5 |

TABLE 4

The microbes that are easily attached to the ciliary contact filter cake of the present device are defined as follows in the treatment of a waste water in accordance with the present invention.

| | | |
|---|---|---|
| First Process | Microbes: | Bacillus, Coccus |
| | Flagellata: | Bodo, Oikomonas, Monas, etc |
| Second Process | Microbes: | Aerobic Bacteria |
| | Protozoa: | Vorticella, Carchesium, Opercularia Trachelophylum, Aspidisca |
| | Metazoa.: | Rotaria, Lecane, Lepadella, Colurella |

Embodiment 2

In waste water treatment using the first and second processes of the present invention, livestock waste water produced from the Dae-Young Farm Livestock was treated. The composition of the livestock waste water is given as follows.

TABLE 5

| | |
|---|---|
| COD (mg/l) | 2,000 |
| SS (mg/l) | 1,000 |
| pH | 7 |
| T-N (Total Nitrogen) (mg/l) | 5,000 |
| T-P (Total Phosphorus) (mg/l) | 120 |

The waste water is treated in the first reaction (facultative anaerobic reaction tank, circulating ciliary contact filter cake) and the second reaction (two aeration tanks) of the present invention. Each aeration tank has a capacity of 300 L and the two aeration tanks have water resting time of 1.5 day in total. Further, the ciliary contact filter cake filed in each aeration tank is 1,260 m$^2$ in area. The results are listed as follows.

TABLE 6

COD treatment efficiency

| First Process | 1200 mg/l |
|---|---|
| Second Process | 80 mg/l |
| Entire Process | 96% |

*residual amount of T-N (total nitrogen) after treatment: 21 mg/l* residual amount of T-P (total phosphorous) after treatment: 5 mg/l

TABLE 7 pH in the reaction and aeration tanks

| First Process | 7.5 |
|---|---|
| Second Process | 7.0 |

TABLE 8

The microbes that are easily attached to the ciliary contact filter cake of the present device are defined as follows in the treatment of a waste water in accordance with the present invention.

| First Process | Microbes: | Spirillium, Bacillus, Coccus |
|---|---|---|
| | Flagellata: | Bodo |
| Second Process | Microbes: | Aerobic Bacteria |
| | Flagellata: | Oikomonas, Monas |
| | Ciliata: | Epsitylis, Trachelophylum |
| | Metazoa.: | Lepadella, Arcella |

As described above, the device for and method of treating a waste water according to the present invention greatly removes the organic materials such as COD, nitrogen and phosphorus contained in the highly concentrated acidic, organic waste water.

It is important to note that the precise shape of the ciliary filter cakes is not so critical as long as they can easily circulate in the biological reaction tank and can be easily secured to the walls, etc., of the aeration tank(s), keeping in mind that they must be pre-treated with microbes as described above. In addition, maintaining circulation in the biological reaction tank may be done by pumps, or the like.

The concrete efficiencies are described in detail in the aforementioned embodiments of the present invention.

What is claimed is:

1. A method of treating waste water, comprising the steps of:

providing a biological reaction tank for receiving and circulating waste water to be treated within the tank and an aeration tank for receiving treated waste water from the biological tank for further biological treatment and aeration;

supplying a plurality of ciliary contact filter cakes to the biological reaction tank with each ciliary filter cake providing a microbe habitat such that said ciliary contact filter cakes freely circulate about the waste water circulating in said biological reaction tank; and supplying a plurality of ciliary contact filter cakes secured to the aeration tank with each ciliary filter cake providing a microbe habitat such that waste water being treated therein freely contacts said ciliary contact filter cakes, thereby providing further water treatment.

2. The method as defined in claim 1, wherein the waste water to be treated in the reaction tank contains a high concentration of organic materials.

3. The method as defined in claim 2, wherein the waste water contains organic materials having the concentration of 1% by weight and is in the range of 3–8.

4. A method of treating waste water, comprising the steps of:

providing a biological reaction tank for receiving and circulating waste water to be treated within the tank and an aeration tank for receiving treated waste water from the biological tank for further biological treatment and aeration;

supplying a plurality of ciliary contact filter cakes to the biological reaction tank with each ciliary filter cake providing a microbe habitat such that said ciliary contact filter cakes freely circulate about the waste water circulating in said biological reaction tank, each of said plurality of ciliary contact filter cakes supplied to the biological reaction tank being first treated by introducing a highly concentrated culture liquid of microbes onto each of said plurality of contact filter cakes and drying at about 60 degrees Celsius, thereby immobilizing the microbes on each of said ciliary contact filter cakes and enhancing the efficiency of the waste water treatment; and supplying a plurality of ciliary contact filter cakes secured to the aeration tank with each ciliary filter cake providing a microbe habitat such that waste water being treated therein freely contacts said ciliary contact filter cakes, thereby providing further water treatment.

5. A method of treating waste water, comprising the steps of:

providing a biological reaction tank for receiving and circulating waste water to be treated within the tank and an aeration tank for receiving treated waste water from the biological tank for further biological treatment and aeration;

supplying a plurality of ciliary contact filter cakes to the biological reaction tank with each ciliary filter cake providing a microbe habitat such that said ciliary contact filter cakes freely circulate about the waste water circulating in said biological reaction tank; and supplying a plurality of ciliary contact filter cakes secured to the aeration tank with each ciliary filter cake providing a microbe habitat such that waste water being treated therein freely contacts said ciliary contact filter cakes, thereby providing further water treatment, each of said plurality of ciliary contact filter cakes supplied to the aeration tank being first treated by introducing a highly concentrated culture liquid of microbes onto each of said plurality of contact filter cakes and drying at about 60 degrees Celsius, thereby immobilizing the microbes on each of said ciliary contact filter cakes and enhancing the efficiency of the waste water treatment.

* * * * *